Patented May 19, 1925.

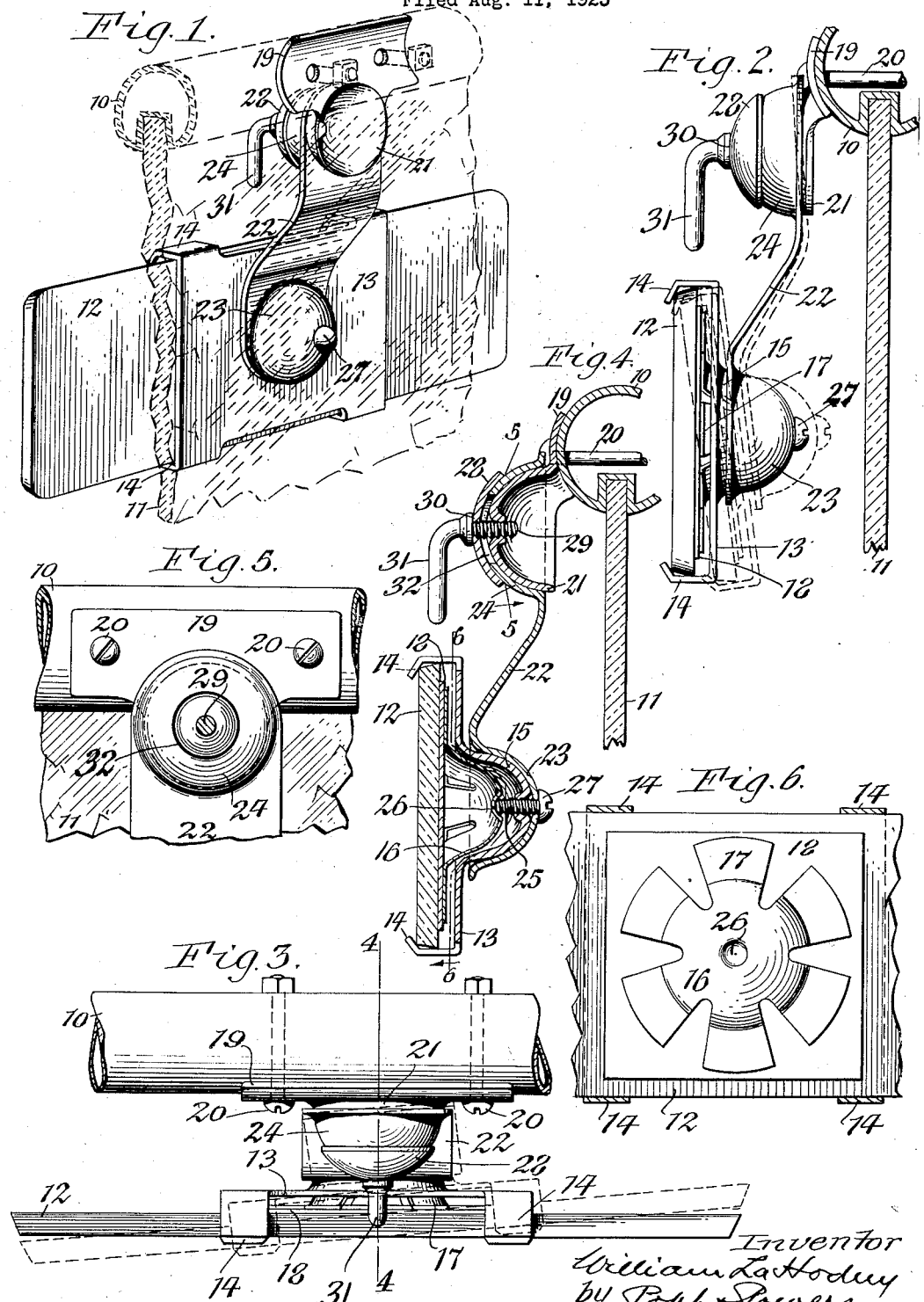

1,538,339

UNITED STATES PATENT OFFICE.

WILLIAM LA HODNY, OF BUFFALO, NEW YORK.

WINDSHIELD-MIRROR BRACKET.

Application filed August 11, 1923. Serial No. 656,963.

*To all whom it may concern:*

Be it known that I, WILLIAM LA HODNY, a citizen of the United States, residing at Buffalo, in the county of Erie and State of New York, have invented a new and useful Improvement in Windshield-Mirror Brackets, of which the following is a specification.

This invention relates to a bracket for adjustably supporting a rear view mirror on the wind shield of an automobile and has for its object the provision of a bracket of this character which will not only permit of tilting the mirror in all directions as best suits the requirements of the driver but will also permit of raising and lowering the mirror bodily to suit the height of the driver or other conditions, and to accomplish this object by means which are simple, durable and efficient in construction, capable of being produced at low cost and not liable to get out of order.

In the accompanying drawings:

Figure 1 is a perspective view viewed from the rear of a mirror supporting bracket embodying my invention. Figure 2 is a side elevation of the same showing it mounted on a wind shield, of which latter only a fragment is shown in section. Figure 3 is a top plan view of the same. Figure 4 is a vertical transverse section taken on line 4—4 of Figure 3. Figures 5 and 6 are fragmentary vertical longitudinal sections taken on the correspondingly numbered lines in Figure 4.

Similar characters of reference indicate like parts throughout the several figures.

Those parts of the wind shield shown in the drawings as one form of fixture upon which the mirror may be supported by means of my improved bracket consists of an upper horizontal bar 10 forming part of the frame and a transparent pane 11 of glass mounted in this frame.

The mirror 12 shown in the drawings as one of various forms which may be supported by means of my improved bracket is here shown as of oblong rectangular form and arranged with its long dimension horizontally and its short dimension vertically.

My improved bracket consists generally of a supporting section which is adapted to be secured to the mirror, a base section adapted to be mounted on the wind shield or similar fixture, and an intermediate link section which pivotally connects the supporting section and the base section.

The supporting section comprises an upright supporting plate 13 adapted to be arranged in rear of the mirror and provided at its opposite edges with forwardly projecting hooks 14 which are adapted to overhang the opposite edges of the mirror, and a rearwardly projecting hollow boss 15 which is of spherical form. This supporting plate together with its hooks and boss are preferably stamped out of a single sheet of metal such as steel or brass. Arranged in front of the supporting plate is a follower or bearing member which in its preferred construction consists of a hollow hub 16 projecting rearwardly into the concave side of the hollow boss 15 and provided at its margin with radial outwardly projecting spring arms 17 adapted to press toward the rear side of the mirror. In order to prevent these arms from injuring the silvered surface of the mirror a protecting sheet 18 of paper or similar material is interposed between the spring arms 17 and the rear side of the mirror, as shown in Figures 4 and 7.

The base section in its preferred construction comprises a base flange 19 adapted to be secured to the inner side of the wind shield bar 10 by means of bolts 20 or other approved means, and a hollow spherical boss 21 projecting forwardly from the lower part of this base flange. The convex side of the boss on the supporting plate faces rearwardly and the convex side of the boss on the base flange faces forwardly. This flange and boss of the base are also preferably constructed from a single sheet of metal which is stamped or formed between suitable dies.

The link section of the bracket is also constructed of a single sheet of metal, comprises a link having a central body portion 22 of substantially Z-shape form and provided at its lower end with a spherical concavo-convex head 23, the concave front surface of which engages with the convex rear surface of the boss 15 on the supporting plate, this body being also provided at its upper end with a spherical concavo-convex upper head 24, the concave side of which faces rearwardly and engages with the convex front side of the spherical boss 21 of the base section. The follower is pressed toward the rear side of the mirror for holding the latter on the supporting section of the bracket and also forming an adjustable pivotal connection between this supporting plate and the link by means of a screw 25 which works with its external screw thread in a threaded opening in the summit of the boss 15 and bears at its inner end against a depressed seat 26 on the summit of the hub 16 while the head 27 at its outer end bears against the outer convex surface of the lower pivot head 23. The opening in the head 23 through which the shank 25 of the clamping screw passes is somewhat larger than the diameter of this shank so as to permit the supporting plate to turn with its boss in all directions within the spherical head 23 of the link and thereby form, in effect, a ball and socket joint, to a limited extent between these members, which permits the mirror to be adjusted as to angularity relatively to the link. The screw 25 is so constructed that upon tightening the same the first effect will be to press the follower against the rear side of the mirror with sufficient force to reliably hold the latter in place but still leave the connection between the lower head 23 and the boss of the supporting plate sufficiently loose to permit of rotary adjustment in all directions. The final tightening of the screw 25 however causes the boss of the supporting plate and the lower link head 23 to be drawn together sufficiently tight to prevent relative movement of these parts under ordinary conditions.

Means are provided for clamping the upper boss 21 and the pivot head 24 together after the same have been adjusted relatively to each other circumferentially, this being preferably effected by means of a concavo-convex clamping disk 28 engaging its concave side with the convex side of the head 24, and a clamping screw 29 passing through the clamping disk 28 and engaging its screw threaded opening in the summit of the boss 21 while its outer part is provided with a collar or shoulder 30 engaging with the outer or convex side of the clamping disk 28 and also provided with a handle or finger piece 31 at its outer end for manipulating the same. The opening 32 in the upper head 24 of the link is sufficiently larger in diameter than the screw 30 so as to permit the head 24 to be turned in all directions on the spherical base portion 21 for bringing the link and the mirror carried thereby to the desired position, after which these parts may be held in place by tightening the screw 29.

By thus rocking the link on the base section and rocking the supporting plate on the link the mirror may be brought to any desired angularity, within certain limits, and then held in the adjusted position as best suits the requirements of the driver.

By swinging the link 22 about the horizontal axis represented by the pivotal connection between the same and the base section, and also turning the supporting section on the lower end of the link, the mirror may be moved vertically bodily into various positions in a plane parallel to the plane of the wind shield to suit the height of the driver and compensate for any particular part of the automobile on which it is desired to mount the mirror.

It will thus be apparent that nearly all of the elements of this device which operate to secure an adjustment of the mirror for varying its angular position also serve as part of the means for shifting the mirror bodily in a vertical direction and then holding the same in place. Moreover these means are very compact in construction and do not trespass upon the space within the automobile where room is usually not too plentiful. Furthermore the several elments of this bracket are of comparatively simple construction and the same can be readily assembled by unskilled help, thereby permitting of manufacturing the same at a minimum cost.

I claim as my invention:

1. A bracket for supporting mirrors on wind shields comprising a supporting plate adapted to be attached to a mirror and provided with a rearwardly projecting spherical boss, a base plate adapted to be attached to a fixture and provided with a forwardly projecting spherical boss, a sheet metal link provided at its upper and lower ends with heads, each of which is of concavo-convex form, said upper head having its concave surface facing rearwardly and engaging with the convex surface of the boss on the base and said lower head having its concave surface facing forwardly and engaging with the convex surface of the boss on said supporting plate, and clamping screws each having its thread working in one of said bosses and operating to press the respective head against the same.

2. A bracket for supporting mirrors on wind shields comprising a supporting plate adapted to be attached to a mirror and provided with a rearwardly projecting spherical boss, a base plate adapted to be attached to a fixture and provided with a forwardly projecting spherical boss, a link provided at its ends with heads, each of which is of concavo-convex form and engages its concave surface with the convex surface of one of said bosses, a clamping screw engaging its thread with the boss of said supporting plate and bearing with its head against the outer side of the head in engagement therewith, a clamping disk engaging with the convex side of the link head engaging with the boss of the base plate, a clamping screw passing through said last-mentioned head and having its thread working in said boss of the base plate and provided with a shoulder bearing against the outer side of said clamping disk, and a follower having a hollow semispherical hub projecting into the concave side of the hollow boss on the supporting plate and engaging with the clamping screw which connects said last mentioned boss and the respective link head and said follower hub being provided at its edge with laterally projecting spring arms engaging with the rear side of the mirror.

In testimony whereof I affix my signature.

WILLIAM LA HODNY.